(No Model.)

A. L. PIERCE & G. McKERCHER.
VEHICLE SPRING GEAR.

No. 392,063. Patented Oct. 30, 1888.

Witnesses.

Inventor.
Albert L. Pierce,
Geo. McKercher,
By Milo B. Stevens & Co. Attorneys.

UNITED STATES PATENT OFFICE.

ALBERT L. PIERCE AND GEORGE McKERCHER, OF JONESVILLE, MICHIGAN; SAID PIERCE ASSIGNOR TO WILLIAM W. WADE, OF SAME PLACE.

VEHICLE-SPRING GEAR.

SPECIFICATION forming part of Letters Patent No. 392,063, dated October 30, 1888.

Application filed December 10, 1887. Serial No. 257,557. (No model.)

*To all whom it may concern:*

Be it known that we, ALBERT L. PIERCE and GEORGE McKERCHER, citizens of the United States, residing at Jonesville, in the county of Hillsdale and State of Michigan, have invented certain new and useful Improvements in Vehicle-Spring Gear; and we do hereby declare the following to be a full, clear, and exact description of the invention, such as will enable others skilled in the art to which it appertains to make and use the same.

Figure 1:
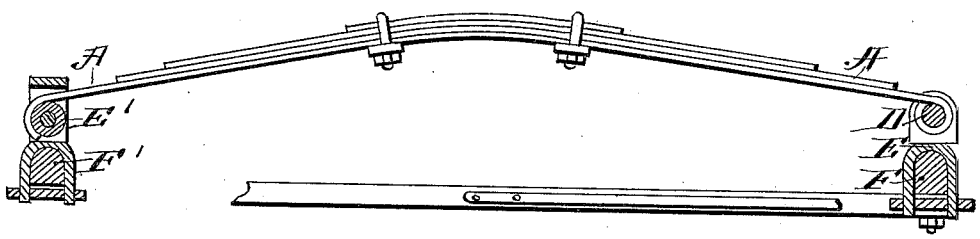
Figure 2:
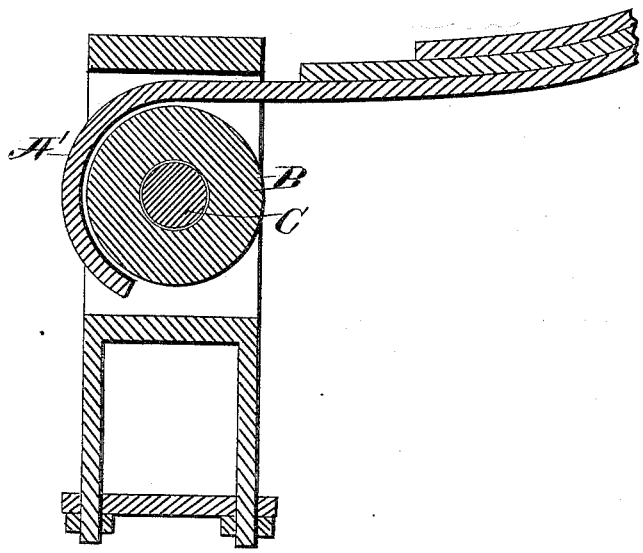

In the accompanying drawings, Figure 1 is a side elevation, partly in section, of a vehicle-gear showing our improvements. Fig. 2 is a section through the spring roller and shackle.

F and F' represent the axle and head-block of a vehicle-gear connected by a reach in the usual manner.

A represents a semi-elliptical or curved spring, which is connected to the rear axle by a bolt, D, supported in the ears of a clip, E. This end of the spring is held in a fixed relation with the axle, so that it cannot slide back and forth. The front end of the spring is formed with a hook, A', which fits over the roller B, which roller is journaled on the pin C, passing through the sides of the box-loop of the clip E', attached to the head-block.

Having thus described our invention, what we claim is—

The combination, with the rear axle and head-block, of a semi-elliptical spring fixed to the rear axle, and having its hook-shaped front end secured upon the roller fixed to the head-block, substantially as set forth.

In testimony whereof we affix our signatures in presence of two witnesses.

ALBERT L. PIERCE.
GEORGE McKERCHER.

Witnesses:
ED. C. VARNUM,
FREELAND G. VARNUM.